E. PARKER.
MACHINE FOR SAWING AND PLANING CLAPBOARDS.
No. 10,341. Patented Dec. 20, 1853.
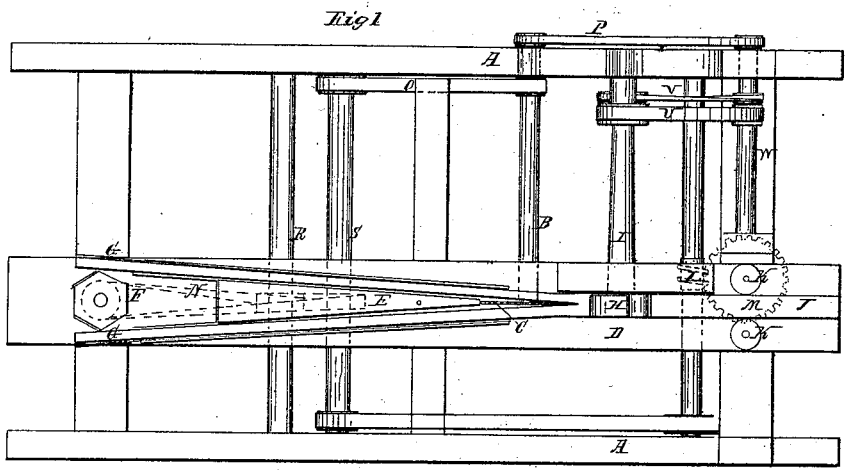
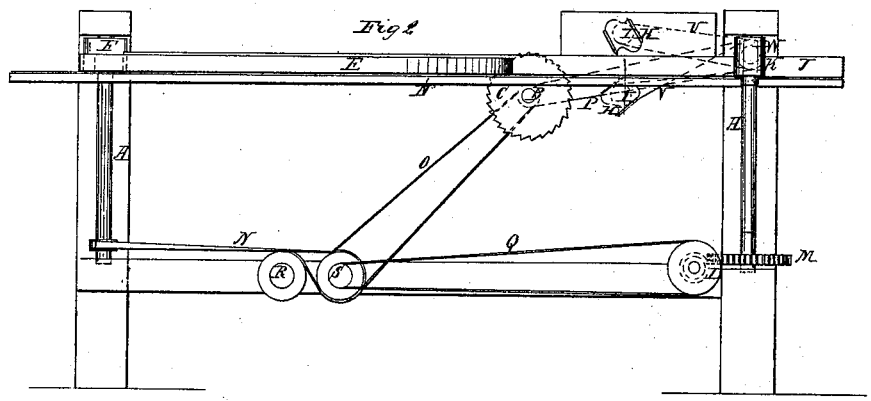
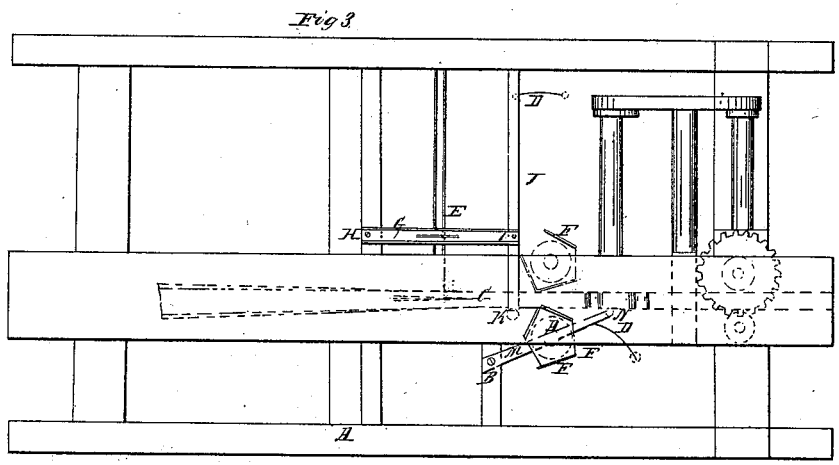

UNITED STATES PATENT OFFICE.

EPHRAIM PARKER, OF ROCK ISLAND, ILLINOIS.

MACHINE FOR SAWING AND PLANING CLAPBOARDS.

Specification of Letters Patent No. 10,341, dated December 20, 1853.

*To all whom it may concern:*

Be it known that I, EPHRAIM PARKER, of Rock Island, in the county of Rock Island and State of Illinois, have invented a new and useful Machine for Sawing and Planing Clapboards; and I do hereby declare that the following is a full, clear, and exact description of the construction and operation of the same, reference being had to the accompanying drawings, making a part of this specification, in which—

Figure 1, is a plan or top view of the machine. Fig. 2, is a side elevation of ditto.

Similar letters of reference indicate corresponding parts, in each figure.

The nature of my invention consists in planing or dressing the insides of two clapboards at the same time by one cutter head, by means of a saw and parting guide, in combination with rotary cutters and movable metallic beds, arranged as will be hereafter shown.

To enable others skilled in the art to make and use my invention, I will proceed to describe its construction and operation.

A, represents a rectangular frame, on the upper part of which is a shaft, B, having a circular saw, C, upon one end.

D is a longitudinal bed-piece, of a suitable width, through which is a slot in which the circular saw revolves; the shaft, B, of the saw, being a short distance below the under surface of the bed, as shown in Fig. 2.

E, is a parting guide, of triangular or V shape; the point of the said guide being toward the saw, as shown in Fig. 1. This guide is about the height of the board, and is secured to the upper surface of the bed-piece, D.

On the outer end of the bed-piece, D, there are rotary-cutters, F; any proper form being used; and at the sides of the bed piece, at its outer end are metallic beds, G, G; one at each side, to support the clapboard, while being planed. These beds are regulated by screws, not shown, to vary the thickness, and bevel the work at each edge to the desired thickness. These metallic beds are shown in Fig. 1; but they are omitted in Fig. 2, in order to enable the rotary cutters to be seen.

H, H, are rotary-cutters attached to shafts, I, I; one set of cutters being above the board desired to be sawed and planed; and the other set of cutters below it, as shown in Fig. 2.

J, represents the board; and K K, are feed rollers, between which the board is fed to the saw.

The "stuff" of which the clap-boards are formed, consists of boards previously sawed to the required width and thickness,—say one inch thick and six inches wide. The board is placed edgewise upon the bed piece, D; and it enters between the feed rollers, K, K. The said feed rollers then force the board along toward the saw, C, which slits the board directly through the center, and a little diagonally, so that each piece shall be, when sawed, about half an inch thick, at one edge and about a quarter of an inch at the other; this is effected by the feed rollers standing, not perpendicular, but a little inclined; making the proper angle with the saw. When the slitted portion of the board reaches the point of the parting guide, E, the said point enters the slit; and the board, as it is forced along, is spread apart by the guide;—that is, the sawed portion of it, as shown in Fig. 1.

The rotary-cutters, F, being placed in the center of the boards, when parted, and in a line with the saw, are consequently between the two halves or strips of board; and the cutters, as they rotate, plane the inner sides of the strips, while the metallic beds, G, G, on the outer sides of the strips, hold them firmly while planing, and giving any required thickness and bevel to the work.

The rotary cutters, H, H, are for the purpose of jointing the upper and lower edges of the board.

Each strip or half of the board, J, as it comes from the machine, forms a perfect clapboard, planed, jointed, and cut to the required thickness.

The machine is quite simple, not liable to get out of order; and will produce or turn out six thousand feet of clap-boards, per day, with the attention of a single hand; each of which clapboards is perfectly finished, and ready for the immediate use of the builder.

Motion may be given to the saw, feed-rollers, and revolving-cutters, in any proper manner. In the accompanying drawings, it will be seen, that motion is given to the feed-rollers, by means of a worm-wheel, L, and pinion, M; the said pinion being attached to the shaft of one of the feed rollers. It will also be seen that motion is given to the rotary-cutters, F, by belts, N, O, P, Q, passing around pulleys on the shafts, R, S, B. The rotary-cutters, H, H, receive motion from belts, U, V, passing around the shafts, I, I, W. Any intelligent mechanic could devise a proper means of giving motion to the several working parts.

What I do claim as new, and desire to secure by Letters Patent, is,

Planing or dressing the insides of two clap boards at the same time, by means of the combination of the saw, C, parting guide, E, one cutter head, F, and the adjustable metallic beds, G, G, the above parts being arranged and operating substantially as herein shown and described.

EPHRAIM PARKER.

Witnesses:
H. A. PORTER,
C. L. BASCOM.